US007984179B1

(12) United States Patent
Huang

(10) Patent No.: US 7,984,179 B1
(45) Date of Patent: Jul. 19, 2011

(54) ADAPTIVE MEDIA TRANSPORT MANAGEMENT FOR CONTINUOUS MEDIA STREAM OVER LAN/WAN ENVIRONMENT

(75) Inventor: Jeffrey Huang, San Jose, CA (US)

(73) Assignee: Sextant Navigation, Inc., San Jose, CA (US)

( * ) Notice: Subject to any disclaimer, the term of this patent is extended or adjusted under 35 U.S.C. 154(b) by 1152 days.

(21) Appl. No.: 11/247,054

(22) Filed: Oct. 11, 2005

Related U.S. Application Data

(63) Continuation of application No. 11/172,489, filed on Jun. 29, 2005, now abandoned.

(60) Provisional application No. 60/583,360, filed on Jun. 29, 2004.

(51) Int. Cl.
*G06F 15/16* (2006.01)
(52) U.S. Cl. ......... 709/233; 709/231; 709/232; 709/235
(58) Field of Classification Search .................. 709/233, 709/231, 232, 235
See application file for complete search history.

(56) References Cited

U.S. PATENT DOCUMENTS

| | | | | |
|---|---|---|---|---|
| 5,928,330 | A | * | 7/1999 | Goetz et al. .................... 709/231 |
| 6,014,694 | A | | 1/2000 | Aharoni et al. |
| 7,363,569 | B2 | * | 4/2008 | Pendakur et al. ............. 714/748 |
| 2002/0181494 | A1 | * | 12/2002 | Rhee .............................. 370/465 |
| 2003/0039398 | A1 | * | 2/2003 | McIntyre ....................... 382/239 |
| 2006/0031564 | A1 | * | 2/2006 | Brassil et al. .................. 709/233 |

OTHER PUBLICATIONS

Bolot et al. ("Scalable Feedback Control for Multicast Video Distribution in the Internet", ACM SIGCOMM Communication Review, vol. 24, Issue 24, pp. 59-67, 1994).*

* cited by examiner

*Primary Examiner* — Karen C Tang
(74) *Attorney, Agent, or Firm* — Invent Capture, LLC.; Samuel S. Cho

(57) ABSTRACT

Methods and systems for transmitting compressed audio/video data streams across conventional networks or channels in real time. Each system employs the Adaptive Rate Control (ARC) technique that is based on the detection of defective packets and other influencing factors such as overall system performance, usage model and channel characteristics. To control data stream congestions in the channel and maintain the visual display quality above a certain level, the present invention exploits the human visual perception and adaptability to changing visual conditions. The ARC technique relies on the client's capacity for calculating the quality of video packets received from a server and sending information of a desired transmission rate to the server. This approach simplifies the hardware and software implementation complexity otherwise imposed on the server and reduces the overall design cost by shifting the burden of monitoring bandwidth and transmission control from the server to the client.

20 Claims, 4 Drawing Sheets

ADAPTIVE MEDIA TRANSPORT MANAGEMENT FOR CONTINUOUS MEDIA STREAM OVER LAN/WAN ENVIRONMENT

CROSS REFERENCE TO RELATED APPLICATIONS

This application is a continuation of U.S. application Ser. No. 11/172,489, entitled "Adaptive media transport management for continuous media stream over lan/wan environment" by Huang, filed on Jun. 29, 2005, which claims the benefit of U.S. Provisional Application No. 60/583,360, filed on Jun. 29, 2004 and is incorporated herein by in its entirety.

FIELD OF THE INVENTION

The present invention relates to multimedia data transmissions, and more particularly, to methods and systems for real-time transmissions of continuous data in a LAN/WAN environment.

BACKGROUND OF THE INVENTION

Video streaming under LAN/WAN environments has gained significant importance as new applications and usage models are introduced. Consumers have enjoyed watching video streaming and/or listening to audio streaming from their desktops or laptops, creating a new paradigm from how the traditional media are consumed. In addition to personal digital video entertainment environments, video streaming has also found acceptance in corporate environments as video conferencing and distance learning become increasingly popular.

Unfortunately, the popularity of video streaming has placed a significant burden on the available bandwidth of existing network infrastructures. In traditional web based applications, meaningful data can be sent or received in a burst mode. For example, a user using the web browser may click on an URL link invoking a website to update the user's web page. The network communication between the web browser and the intended website may last until the web page is updated or until the user refreshes its browser by selecting another URL. However, unlike traditional web based applications, the streaming audio/video data must be sent to a client (viewer) in a continuous stream once a connection between the client and the server is established. If the amount of data flow is not maintained above a certain level (or, equivalently a minimum throughput), the video may appear to have stopped because the decoder does not have enough data to act upon (decoder). The video will resume once the data becomes available again. This phenomenon is known as the video jitter.

Unlike traditional video broadcasts where video information is transmitted in an analog domain, the streaming video information must be converted to digital format, hence IP packets, prior to transmission over an IP network, such as home network (LAN) or the Internet (WAN). However, a simple conversion of video from an analog domain to a digital domain does not immediately enable the user to transmit the video over the IP network since the required video bandwidth is greater than those most existing networks allow. For example, a standard household television running at the rate of standard 30 frames per second (according to national television standard committee) and having 720×480 pixels where each pixel requires 2 bytes for color presentation, the minimum throughput for a full screen video transmission without any data compression would be around 19.78 MBps or 158 Mbps. Clearly, this requirement exceeds the capacity of a typical LAN (10/100 Mbps) can support. Therefore, sending raw video footage through a conventional network is not practical, or at the very least, live video transmission on the network is difficult with the current technology. Therefore, compressing the video data prior to transmitting the data over the IF network becomes a requirement.

Various video compression techniques have been introduced and continuously improved. Some of the most notable ones are MPEG, H.261, H.263 and H.264. However, even with these compression engines, a constant throughput is still required to send the streaming video from a server to a display client. Unfortunately, the LAN/WAN was designed as a "Best Effort" medium, meaning that it attempts to get the data to from the source (server) to the sink (client) in the least amount of time as possible, but without guaranteed.

When the minimum throughput requirement is not satisfied, video jitters may appear during the playback. Methods, such as allocating buffers on both the client and the server, are widely used in video-on-demand (VOD) applications to address the video jitters inherent in streaming videos. A content provider (or, equivalently server) in a typical VOD application may retransmit the video data as requested by the display client due to packet loss or corruptions during transit. This technique may obviate the video jitters and enhance the viewing experience. However, this method, although serves the purpose of VOD, may introduce a significant delay in applications where a real-time viewing is required. Some of the real time applications, such as live video broadcast, security monitoring, and video conferencing, may be time-sensitive in that the server cannot send the video data more than once.

To overcome the network's "Best Effort" behavior while managing the network traffic more effectively and predictably, different QoS (Quality of Service) approaches have been developed. For example, in one approach, a priority flag may be placed in the stream header allowing a streaming application to receive a higher level of service from routers and other applications (DiffServ). In another approach, a streaming application may broadcast its service requirements to the network via a reservation request (IntServ). In general, the streaming applications based on the QoS-award routers may use resource reservation setup protocol (RSVP) as their end-to-end signaling protocol. Unfortunately, these approaches cannot guarantee that every hop between the server and the client has facilities to support or understand these protocols and, as a consequence, may fail to achieve the continuous data flow requirement of those mission critical applications.

Thus, there is a strong need for a system that can transmit video data in real time across conventional networks, while the minimum threshold requirement is satisfied during the data transmission to maintain a video quality acceptable to human visual perception.

SUMMARY OF THE INVENTION

The present invention provides methods and systems for transmitting compressed audio/video data streams across conventional networks or channels in real time. Each system employs the Adaptive Rate Control (ARC) technique that is based on the detection of defective packets and other influencing factors such as overall system performance, usage model and channel characteristics. To control data stream congestions in the channels and maintain the visual display quality above a certain level, the present invention further exploits the human visual perception and adaptability to changing visual conditions.

The ARC technique relies on the client's capacity for calculating the quality of video packets received from a server and sending information of a desired transmission rate to the server. This approach simplifies the hardware and software implementation complexity otherwise imposed on the server or content provider and reduces the overall design cost by shifting the burden of monitoring bandwidth and transmission control from the server to the client.

In one aspect of the present invention, a method for controlling a transmission rate of a data stream from a server to a client in real time, wherein the client has a look-up table generated using a set of characteristics thereof, includes steps of: receiving a first portion of a data stream from the server at a transmission rate, the first portion including data packets; checking integrity of the data packets; determining a packet loss ratio based on the integrity; generating a request for an adjustment of the transmission rate using the packet loss ratio and the look-up table; sending the request to the server; and receiving a second portion of the data stream at an adjusted transmission rate from the server.

In another aspect of the present invention, a method for controlling a transmission rate of a data stream from a server to a client in real time, wherein the client has a look-up table generated using a set of characteristics thereof, includes steps of: receiving a request for an adjustment of the transmission rate from the client, wherein the client uses a packet loss ratio and the look-up table to generate the request; receiving at least one audio input and at least one video input; updating a data rate and the transmission rate based on the request; encoding the audio input and the video input at the updated data rate; multiplexing the encoded audio and video inputs into the data stream; and transmitting the data stream to the client.

In still another aspect of the present invention, a method for controlling a transmission rate of a data stream from a server to a client in real time, wherein the client has a look-up table generated using a set of characteristics thereof, includes steps of: causing the server to transmit a first portion of a data stream to the client at a transmission rate; causing the client to receive the first portion, the first portion including data packets; causing the client to check integrity of the data packets and determine a packet loss ratio based on the integrity; causing the client to generate a request for an adjustment of the transmission rate using the packet loss ratio and the look-up table and send the request to the server; causing the server to receive the request and adjust the transmission rate based on the request; and causing the server to transmit a second portion of the data stream at an adjusted transmission rate.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

It must be noted that, as used herein and in the appended claims, the singular forms "a", "and", and "the" include plural referents unless the context clearly dictates otherwise. Thus, for example, reference to "a client" includes one or more clients and equivalents thereof known to those skilled in the art, and so forth.

Broadly, the present invention provides methods and systems for transmitting compressed audio/video data streams across conventional networks or channels in real time environments. Each system may employ the Adaptive Rate Control (ARC) technique that is based on the detection of defective packets and other influencing factors such as overall system performance, usage model and channel characteristics. Unlike existing congestion control mechanisms solely based on channel characteristics or multilayer streams approach, the present invention may exploit the human visual perception and adaptability to changing visual conditions to maintain the visual display quality above an acceptable level.

The ARC technique may rely on the client's capacity for calculating the quality of video packets received from a server and sending information of a desired transmission rate to the server. This approach simplifies the hardware/software implementation complexity otherwise imposed on the server or content provider and reduces the overall design cost by shifting the burden of monitoring bandwidth and transmission control from the server to the client.

Figure 1:
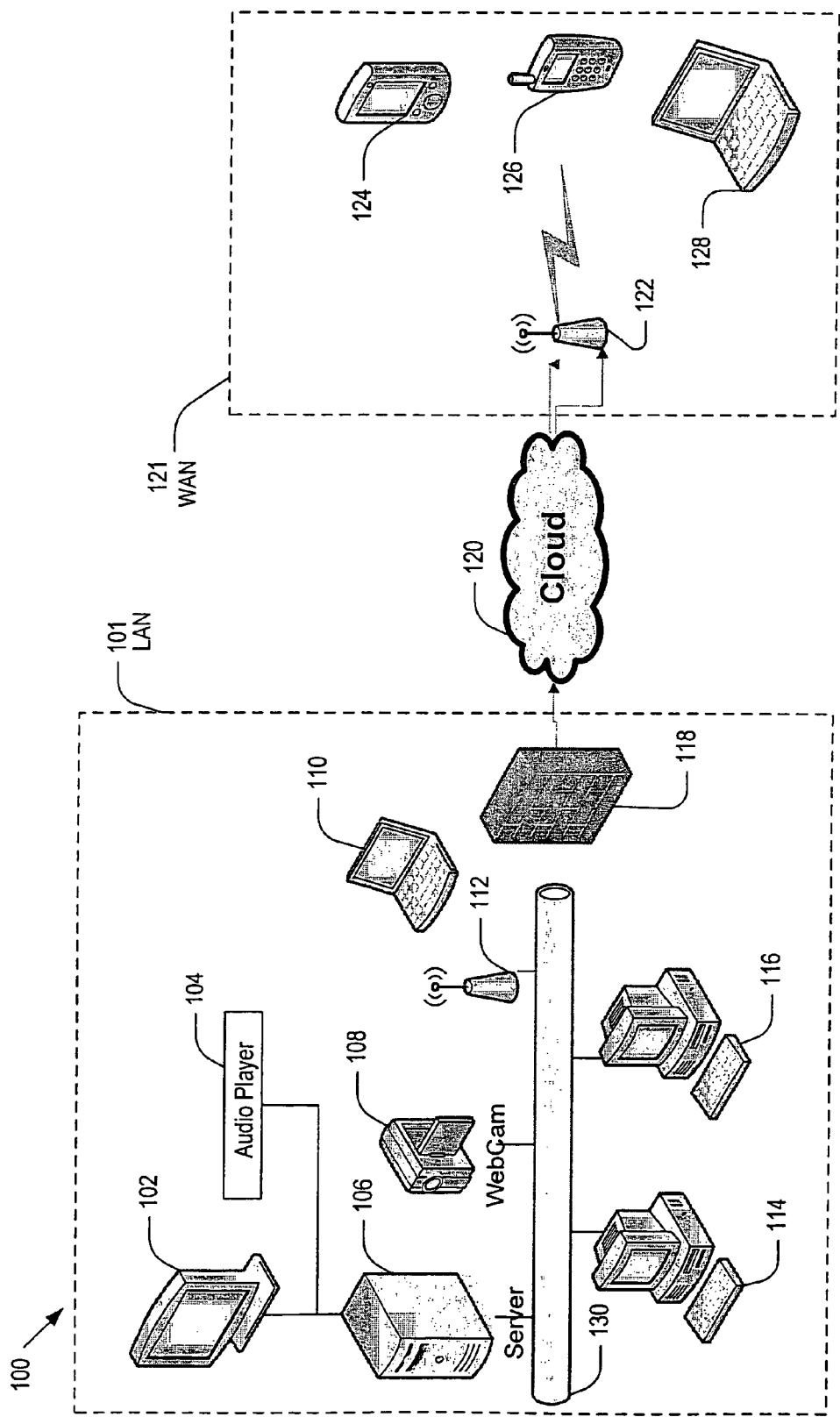
FIG. 1 is a schematic diagram of a real-time audio/video data transmission system in accordance with the present invention.

Referring now to FIG. 1, FIG. 1 is a schematic diagram of a real-time audio/video data transmission system shown at 100 and having a local area network (LAN) system 101 and a wide are network (WAN) system 121 in accordance with the present invention. As illustrated, the LAN system 101, which refers to the network system on the left side of the cloud 120, may include a network wire or WiFi channel 130 (hereinafter, shortly wire), personal computers (PCs) 114 and 116 connected to the wire 130, a server 106 connected to the wire 130, a router 112 connected to the wire 130 and a laptop computer 110 configured to communicate with the router 112. The LAN system 101 may also include audio/video display devices, such as webcam 108, audio player 104 and TV 102, wherein the audio/video devices may be coupled to the server 106 and exchange audio/video data with the server (wired or wirelessly) 106 in real time. The LAN system 101 may communicate with other LAN or WAN systems through the cloud 120, which is preferably the Internet. A firewall 118, which may be included in the LAN system 101, may prevent malicious data/programs, such as computer virus and spyware, from entering the system.

The WAN system 121, which refers to the system on the right side of the cloud 120, may include a set of clients or client devices and an Access Point or commonly referred to as Hot Spot 122 for providing wireless communication for the clients, wherein the clients include a PC 128 and other handheld devices, such as PDA 124 and cell phone 126. The clients 124, 126 and 128 may communicate with the server 106 through the cloud 120, where the server may be a media server or a content provider for providing streaming data to the clients in real time. Hereinafter, the term client (or client device) refers to a device that is configured to communicate with the server 106 and exchange streaming data in real time with the server 106. A client may have one or more audio/video display systems for displaying the streaming data. Further details of the data flow between the server and one of the clients may be given in connection with FIGS. 2-4. In FIG. 1, only nine clients 102, 104, 108, 110, 114, 116, 124, 126 and 128 are shown for convenience. However, it should be apparent to those of ordinary skill that other suitable types of client devices may be used in the system shown at 100.

Figure 2:
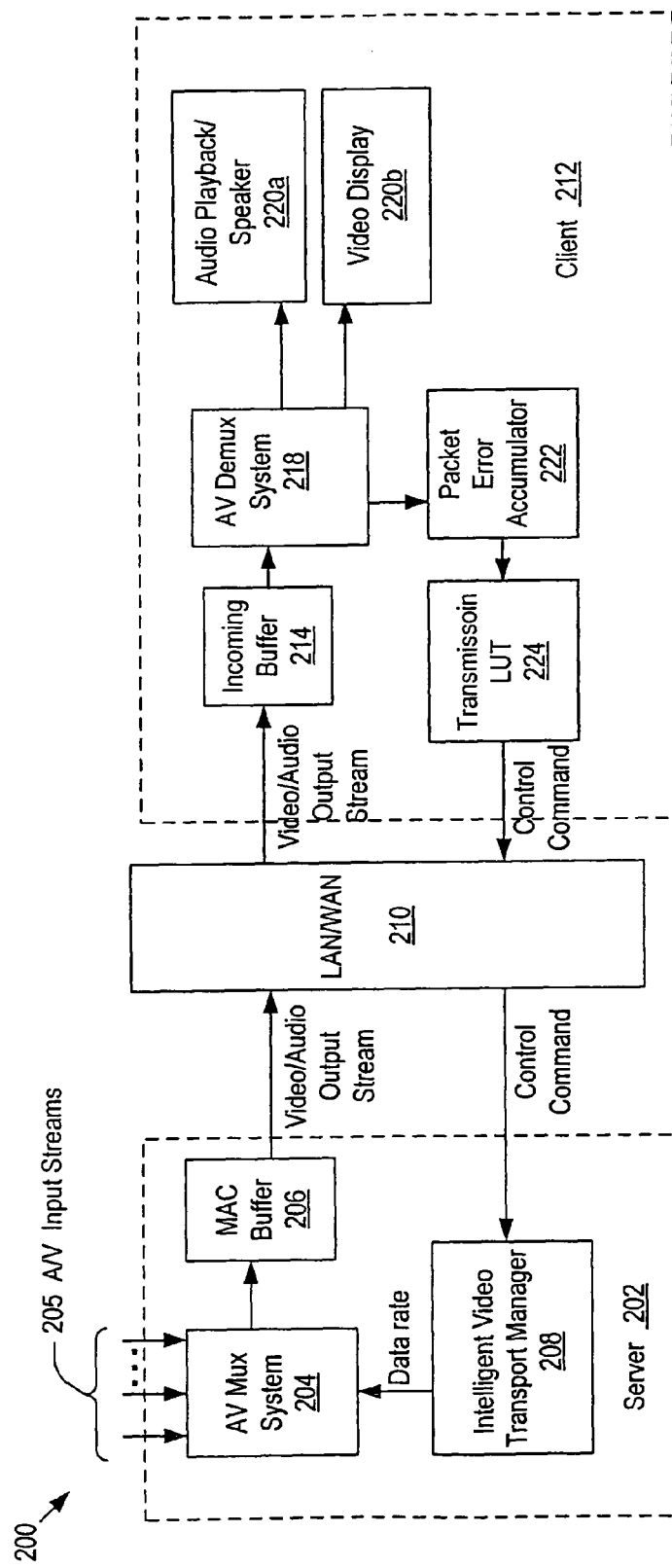
FIG. 2 is a block diagram illustrating data flow between the server and one of the clients generally depicted in FIG. 1.

FIG. 2 is a block diagram shown at 200 illustrating the data flow in a real-time mode between the server and one of the client devices generally depicted in FIG. 1. As illustrated, a server 202 may transmit multiplexed video/audio output data to a client 212 via a network (LAN/WAN) 210. (Hereinafter, the terms multiplex and interleave will be used interchangeably.) The multiplexed video/audio output data may include video data compressed at a predetermined data rate, which is referred to as compression rate, to reduce the stream congestion in the network 210 and be formatted according to a user datagram protocol (UDP). A method to determine the data rate will be detailed later.

When the client 212 receives the multiplexed video/audio data, it may store the data in an incoming buffer 214 temporarily. Then, the incoming buffer 214 may relay the data to an AV de-multiplexing (Demux) system 218 that may de-multiplex the data into two separate sets of data (each containing either a video or an audio signal), check the integrity of the two sets of data and decode the two sets of data. (As will be explained later, the server 202 may interleave an audio stream and a video stream into a single stream prior to sending to the client 212.) As mentioned previously, each video frame may require a considerable amount of data and, as a consequence, each frame data may be divided into a number of data packets before sent through the network 210. Each packet may have a header carrying the information of total packets in the frame, sequence number of the packet within the frame, frame checksum (for parity) and packet length.

A video ring buffer 244 and an audio ring buffer 242 (shown in FIG. 4) of the AV Demux system 218 may serve to verify the integrity of video data packets and audio data packets, respectively. (Further details of the AV Demux system 218 are given in connection with FIG. 4.) When the video ring buffer 244 encounters a corrupt or lost packet (collectively referred to as defective packet), it may discard the frame containing the defective packet and send a notice to a packet error accumulator 222. In an alternative embodiment, in case of a corrupt packet, an error correction method, such as Forward Error Corrections, may be employed to reconstruct the frame. In another alternative embodiment, in case of a loss data (missing packet), a recovery method, such as Reversible Variable Length codes, may be employed to process the frame. The AV Demux system 218 may send the decoded audio and video data to an audio playback/speaker 220a and a video display 220b, respectively.

The packet error accumulator 222 may determine and send a packet loss ratio to a transmission LUT 224 on a regular basis, where the packet loss ratio is defined as the ratio of defective packet count to the total number of packets received during a time interval. At the beginning of the time interval, the packet error accumulator 222 may reset the defective packet count. Upon receiving the notification of a defective packet from the AV Demux system 218, the packet error accumulator 222 may increment the defective packet count by one. Simultaneously, it may count the total number of packets received during the time interval. At the end of the time interval, the packet error accumulator 222 may calculate the packet loss ratio and send the ratio to the transmission LUT 224.

It is noted that the client 212 may also send the information of its characteristics to the intelligent video transport manager 208 at the beginning of the communication between the server 202 and the client 212. The client characteristics may include display size, maximum resolution, number of supported color bits (or, equivalently color depth), display type (such as LCD, CRT or Plasma), CPU type, decoder capabilities indicating the type of format it may support (such as MPEG1, MPEG2, MPEG4, H.263, H.264, or the like), available memory, connection type (such as WiFi, LAN, Bluetooth, etc.), previous connection history describing transmission information (such as frame rate, data rate, quantization level, resolution), and line structure (progressive/interlaced) of the video display 220b. Then, based on the characteristics information, the server 202 may determine the initial transmission rate, which may minimize latency in the data transmission and maximize the received data quality.

The transmission LUT 224 may read a look-up table using the packet loss ratio to determine if the current transmission rate needs an adjustment. The look-up table may be client-specific and generated using the characteristics of the client 212. Then, the transmission LUT 224 may send a request (denoted as Control Command in FIG. 2) for an adjustment of the current transmission rate to an intelligent video transport manager 208 via the network 210. Further details of the adjustment will be given in connection with FIG. 4.

Using the request and characteristics information sent by the client 212, the intelligent video transport manager 208 may adjust a set of parameters including target frame rate, target display bit rate, target resolution, target audio sampling rate, scale size, and quantization value. The intelligent video transport manager 208 can also perform a Luminance-Chrominance (YUV) conversion (4:2:2 to 4:2:0) adjustment based on a current packet loss ratio information sent by the client 212 as part of the request and characteristics information. By definition of the term "YUV conversion" which is well-known in the art, a YUV conversion can transform more video color content information to less video color content information (4:2:2 to 4:2:0) or vice versa at the encoding stage of video information in the server 202. The intelligent video transport manager 208 may also adjust the data compression rate or data rate and then sends the adjusted data rate information to an AV Mux system 204. The AV multiplexing (Mux) system 204 may receive one or more audio/video input streams 205, encode the one or more received input streams, compress the one or more received input streams using at least some data rate information received from the intelligent video transport manager 208, divide each frame data into a number of packets, and then send the packets to a media access control (MAC) buffer 206. In one embodiment of the invention, each video frame comprises a considerable amount of data and is divided into a number of data packets for ease of transmission through the network 210. In one embodiment of the invention, the MAC buffer 206 may temporarily contain packets to be transmitted through the network 210 and send the packets in a unicast, a multicast, or a broadcast mode depending on the number of clients.

Figure 3:
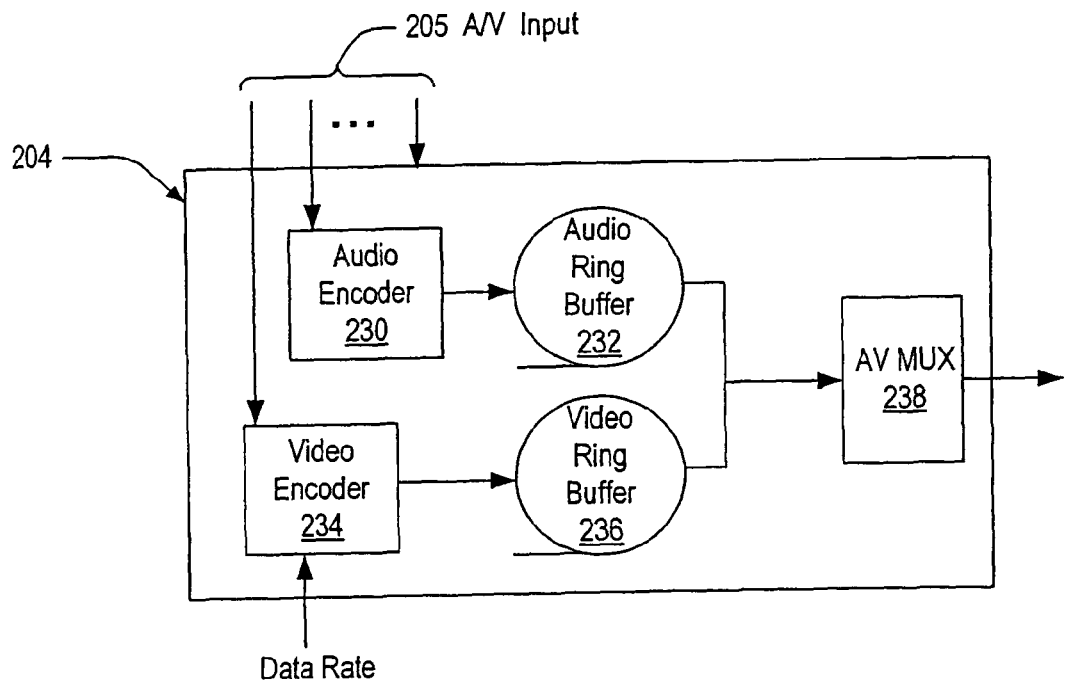
FIG. 3 is a block diagram of an audio/video multiplexing system implemented in the server shown in FIG. 2.

FIG. 3 is a block diagram of an audio/video multiplexing (AV Mux) system 204 implemented in the server 202 shown in FIG. 2. As illustrated, the AV Mux system 204 may include an audio encoder 230 for encoding an audio input stream, an audio ring buffer 232 for relaying the encoded audio input stream to an AV Mux 238, a video encoder 234 for encoding (or, equivalently compressing) an video input stream at the data rate received from the intelligent video transport manager 208, a video ring buffer for 236 for relaying the encoded video stream to the AV Mux 238, and the AV Mux 238 for multiplexing the encoded audio and video streams into a single multiplexed data stream. To maintain the audio/video synchronization and sampling clock integrity, the AV Mux 238 may interlace the encoded audio stream with the encoded video stream.

Figure 4:
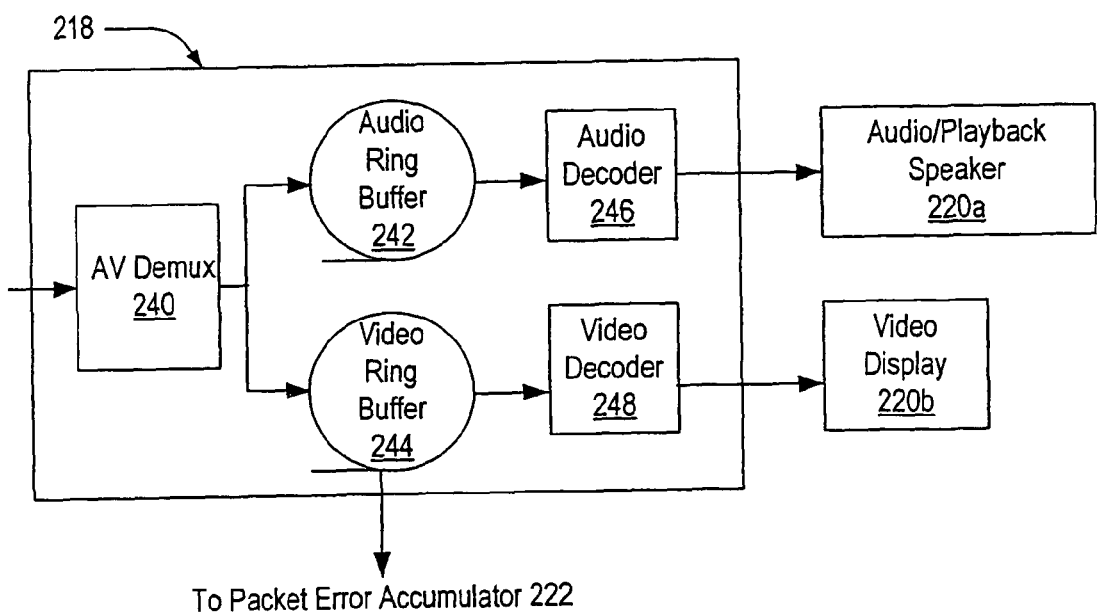
FIG. 4 is a block diagram of an audio/video de-multiplexing system implemented in the client shown in FIG. 2.

As mentioned previously, multiplexed stream packets sent by a server may be lost or corrupted during a transmission through a network due to network congestions, decoder load saturation, or system load saturation. For this reason, the integrity of the multiplexed stream packets received through the network must be checked after de-multiplexing the stream packets. For example, FIG. 4 is a block diagram of the AV Demux system 218 shown in FIG. 2, wherein the AV Demux system 218 may de-multiplex the received stream into an audio and a video stream, check the integrity of the video stream and decode the streams for the audio playback/speaker and video displays 220a-b. As illustrated, an AV Demux 240 may decouple the received data stream into an audio and a video stream. Then, it may place the video stream into the video ring buffer 244 and audio stream into an audio ring buffer 242. The audio ring buffer 242 and video ring buffer 244 may check AV Sync and frame Sync, respectively, and perform necessary corrections prior to decoding. The video ring buffer 244 may also serve to verify the integrity of the video stream (or packets) by checking if there were any corrupt and/or lost packets. When the video ring buffer 244 encounters a defective packet, it may send a notice to the packet error accumulator 222.

As explained previously, the packet error accumulator 222 may determine and send a packet loss ratio to the transmission LUT 224. Based on the packet loss ratio, the transmission LUT 224 may generate a request for an adjustment of the transmission rate and send the request (or, equivalently Control Command) via a UDP channel to the server 202. The UDP command port/channel is an arbitrary port assigned and reserved by the server 202 specifically for communicating with the client 212. Subsequently, the server 202 may adjust the transmission rate by controlling the compression rate, frame rate, group of pictures (GOP) size, quantization level, display resolution, or any combination thereof.

The packet loss ratio may be an indicator of the transmission state in the network 210. The transmission LUT 224 may read a look-up table using the packet loss ratio, wherein the look-up table may be client-specific and generated using a set of characteristics including display size, maximum resolution, number of supported color bits (or, equivalently color depth), display type (such as LCD, CRT or Plasma), CPU type, decoder capabilities indicating the type of format it may support (such as MPEG1, MPEG2, MPEG4, H.263, H.264, or the like), available memory, connection type (such as WiFi, LAN, Bluetooth, etc.), previous connection history describing transmission information (such as frame rate, data rate, quantization level, resolution), and line structure (progressive/interlaced) of the video display 220b.

The transmission state may be broken down into, but not limited to, three "substrates," (1) an unloaded state, (2) a steady state (alternatively called "loaded"), and (3) a congested state. Each substrate may have a predetermined range of the packet loss ratio. For example, in one embodiment of the invention, if a current transmission state is in an unloaded state in which the packet loss ratio is less than 5% (e.g. representing a maximum loss of 1.5 fps operating at 30 fps), the transmission LUT 224 may determine that the current transmission state is in the unloaded state and a higher encoding rate can be achieved from the client characteristic profile. The transmission LUT 224 may request the server 202 to increase the transmission rate in an incremental manner until the packet loss ratio exceeds 30% (i.e. until the transmission state reaches the congested state). Then, the transmission LUT 224 may request the server 202 to reduce the transmission rate until a steady state (alternatively called a "loaded state") is reached (i.e. the packet loss ratio reaches a steady state). If the packet ratio indicates that transmission state has reached a steady state, the transmission LUT 224 may send an NOP signal request to the server 202, wherein the NOP signal can be interpreted as a "No-Operation" signal, a "do nothing" signal, or a "do not change data rate" signal to the intelligent video transport manager 208. Because the network traffic profile may change with time, in one embodiment of the invention, the client 212 can send a request for an increase in data rate to the server 202 based on a packet loss ratio calculated in the packet error accumulator 222 used as a key to the transmission LUT 224.

The threshold level of the packet loss ratio may be adjusted conservatively so that the display quality perceived by the user of the client 212 may degrade, or improve, gracefully as the network condition changes. Since there is no additional bandwidth traffic information available to the client 212 other than its current transmission rate, the client 212 may periodically request the server to increase the transmission rate so that higher video quality can be achieved. In addition to monitoring the quality of the incoming AV packet stream, the client 212 may also notify the server 202 if the display size has been reduced by the customer, thereby reducing the transmission data rate to match the new display size and reducing the bandwidth requirement.

It is noted that the present approach for controlling the transmission rate, termed as Adaptive Rate Control (ARC) technique, may be based on the loss packet detection as opposed to conventional buffer based methods favored by a real-time transport protocol (RTP). As the ARC technique may mainly depend on a client that is capable of calculating the quality of the video stream packets and sending information of a desired transmission rate to a server, the burden of monitoring bandwidth and data rate control may be shifted from the server to the client. Also, the ARC technique may allow the client to request the server to send data stream at an optimum transmission rate reducing the possibility of transmission congestion in the network.

Figure 5:
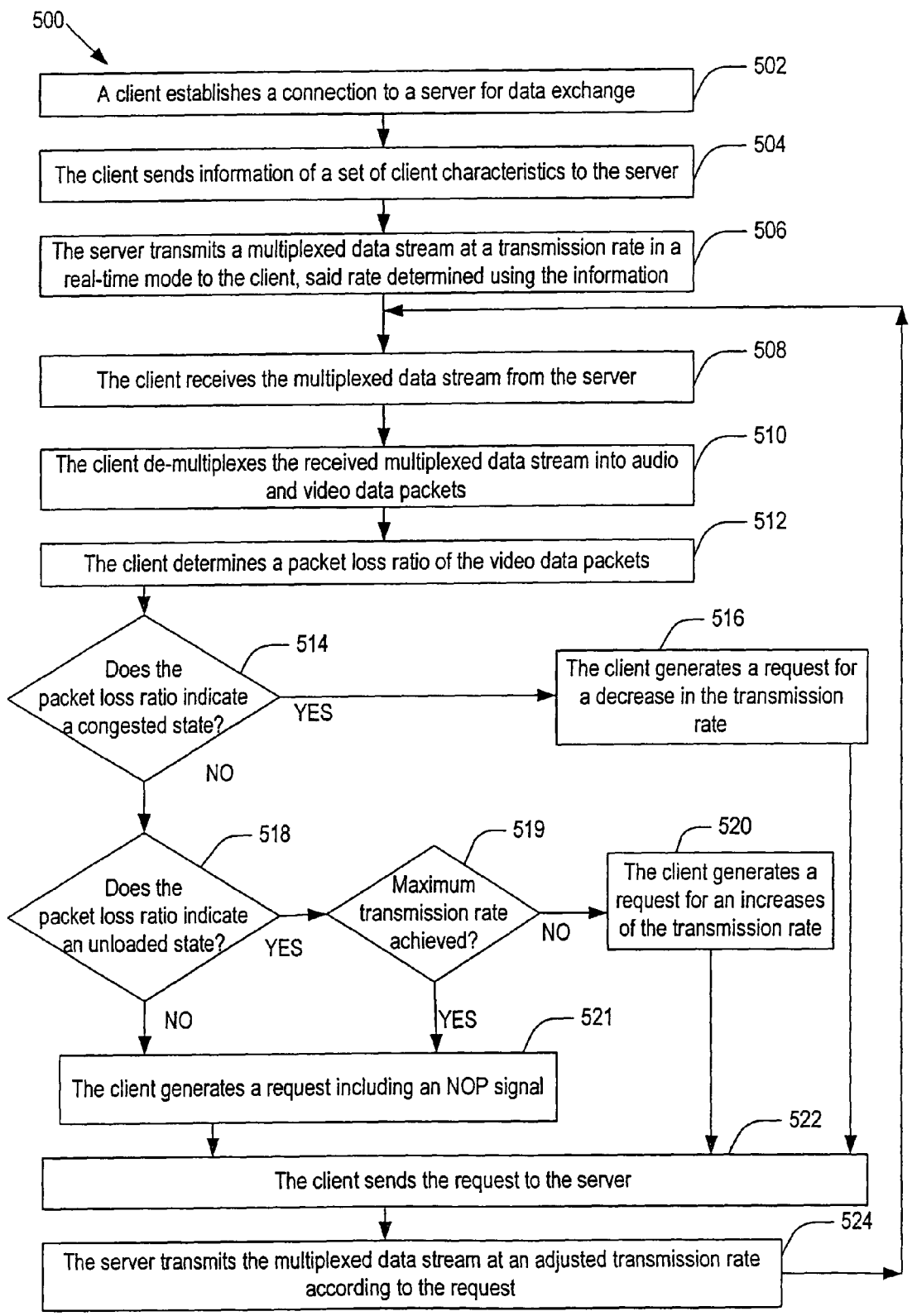
FIG. 5 is a flow chart illustrating exemplary steps that may be carried out to control a data transmission rate according to the present invention.

FIG. 5 is a flow chart shown at 500 illustrating exemplary steps that may be carried out to control a data transmission rate according to the present invention. It will be appreciated by those of the ordinary skill that the illustrated process may be modified in a variety of ways without departing from the spirit and scope of the present invention. For example, in an alternative embodiment, various portions of the illustrated process may be combined, be rearranged in an alternate sequence, be removed, and the like. In addition, it should be noted that the process may be performed in a variety of ways, such as by software executing in a general-purpose computer, by firmware and/or computer readable medium executed by a microprocessor, by dedicated hardware, and the like.

The process may begin at a state 502. In the state 502, a client may establish a connection or channel via a network (LAN/WAN) to a server for data exchange. Then, in a state 504, the client may send the information of a set of client characteristics to the server at the beginning of the channel establishment. The client characteristics may include display size, maximum resolution, number of supported color bits (or, equivalently color depth), display type (such as LCD, CRT or Plasma), CPU type, decoder capabilities indicating the type of format it may support (such as MPEG1, MPEG2, MPEG4, H.263, H.264, or the like), available memory, connection type (such as WiFi, LAN, Bluetooth, etc.), previous connection history describing transmission information (such as frame rate, data rate, quantization level, resolution), and line structure (progressive/interlaced) of the video display 220b. Then, in a state 506, the server may determine a transmission rate based on the client characteristics information and send a multiplexed data stream at the transmission rate in a real-time mode to the client. The multiplexed data may include audio and video data in the form of data packets. Then, the process may proceed to a state 508.

In the state 508, the client may receive the multiplexed data stream from the server. Next, the client may de-multiplex the received data stream into audio and video data packets in state 510. Subsequently, in a state 512, the client may determine a packet loss ratio of the video data packets based on the number of defective data packets. Then, the process may advance to a decision diamond 514.

In the state 514, the client may determine if the packet loss ratio indicates a congested state in the network. Upon positive answer to the state 514, the client may generate a request for a decrease in the transmission rate in a state 516. Then, the process may proceed to a state 522. Otherwise, the process may advance to another decision diamond 518.

In the state 518, a determination may be made as to whether the packet loss ratio indicates an unloaded state in the network. Upon positive answer to the state 518, the process may proceed to a state 519. In the state 519, a determination may be made as to whether the transmission rate has reached the maximum transmission rate. Upon negative answer to the state 519, the client may generate a request for an increase of the transmission rate in a state 520. Then, the process may proceed to the state 522.

Upon negative answer to the state 518 or a positive answer to the state 519, the process may advance to a state 521. In the state 521, the client may generate a request including an NOP ("do no change the data rate") signal. Then, the process may proceed to a state 522. In the state 522, the client may send the request to the server. Subsequently, in a state 524, the server may transmit the multiplexed data stream at an adjusted transmission rate, wherein the adjusted transmission rate is determined in accordance with the request. Then, the process may proceed to a state 508 until the transmission is complete. It is noted that the steps 508-524 should be performed on a regular basis to maintain the channel established between the server and the client.

It should be understood, of course, that the foregoing relates to exemplary embodiments of the invention and that modifications may be made without departing from the spirit and scope of the invention as set forth in the following claims.

What is claimed is:

1. A method for controlling a transmission rate of a data stream from a server to a client in real time, wherein the client generates a look-up table by using a set of dynamically-changing client characteristics and accesses the look-up table by using a dynamically-updated data packet loss ratio as a look-up table key, the method comprising:
   receiving a first portion of the data stream from the server at a first transmission rate, the first portion including a plurality of data packets;
   checking integrity of the data packets;
   deriving the dynamically-updated data packet loss ratio based on the integrity;
   generating a client request for an adjustment of the first transmission rate to the server, wherein the client independently determines an adjusted transmission rate based on the dynamically-updated data packet loss ratio and one or more dynamically-changing values in the look-up table in the client associated with the set of dynamically-changing client characteristics, which changes during a process of data transmission from the server to the client;
   sending the client request to the server;
   processing the client request in an intelligent video transport manager associated with the server for the adjustment of the first transmission rate or an adjustment for a desired Luminance-Chrominance (YUV) conversion format for more video color content information to less video color content information or vice versa; and
   receiving a second portion of the data stream at the adjusted transmission rate from the server.

2. The method of claim 1, further comprising, prior to the step of receiving the first portion of the data stream:
   establishing a connection between the client and the server;
   causing the client to send the one or more values from the set of client characteristics to the server; and
   causing the server to determine the first transmission rate using the one or more values from the set of client characteristics sent by the client and transmit the first portion at the first transmission rate to the client.

3. The method of claim 1, wherein the set of client characteristics contained in the look-up table include the desired Luminance-Chrominance (YUV) conversion format for more video color content information to less video color content information or vice versa, depending on a current value of the dynamically-updated data packet loss ratio.

4. The method of claim 1, wherein the data stream is a multiplexed data stream including an audio stream and a video stream, further comprising, prior to the step of checking integrity:
   de-multiplexing the first portion of the data stream into the audio stream and the video stream.

5. The method of claim 4, further comprising, prior to the step of checking integrity: decoding the audio stream and the video stream.

6. The method of claim 1, wherein the step of deriving the dynamically-updated data packet loss ratio includes the step of:
   taking a percentage of defective data packets in the plurality of data packets, wherein each of the defective data packets is a corrupt data packet or a data packet lost in the step of receiving the first portion of the data stream.

7. The method of claim 1, wherein the step of generating the client request for the adjustment of the first transmission rate includes steps of:
   determining whether the dynamically-updated data packet loss ratio indicates a congested state;
   if the dynamically-updated data packet loss ratio indicates a congested state:
     generating the client request for a decrease in the first transmission rate; and
     determining whether the dynamically-updated data packet loss ratio indicates an unloaded state, a maximum transmission rate, or a steady state;
   else if the dynamically-updated data packet loss ratio does not indicate an unloaded state:
     generating the client request including a No-Operation (NOP) signal; and
   else if the dynamically-updated data packet loss ratio indicates the unloaded state:
     determining whether the first transmission rate has reached the maximum transmission rate;

if the first transmission rate has not reached a maximum transmission rate:
   generating the client request for an increase of the first transmission rate; and
if the first transmission rate has reached the maximum transmission rate:
   generating the client request including a No-Operation (NOP) signal.

8. The method of claim 1, wherein the data stream is formatted according to a user datagram protocol (UDP).

9. The method of claim 1, wherein the data stream is transmitted through a network, the network including at least one of a local area network (LAN) and a wide area network (WAN).

10. The method of claim 1, wherein the client includes a visual device.

11. The method of claim 1, further comprising:
repeating from the step of checking integrity to the step of receiving the second portion until an entire portion of the data stream is received by the client.

12. The method of claim 1, wherein the first transmission rate has a set of parameters including at least one of a target frame rate, a target display bit rate, a target resolution, a target audio sampling rate, a quantization value, a Luminance-Chrominance (YUV) conversion, a scale size and a connection history describing a previous state of connection.

13. A method for controlling a transmission rate of a data stream from a server to a client in real time, wherein the client generates a look-up table associated with client characteristics and accesses the look-up table by using a dynamically-updated data packet loss ratio as a look-up table key, the method comprising:
receiving a client request for an adjustment of the transmission rate or an adjustment for a desired Luminance-Chrominance (YUV) conversion format for more video color content information to less video color content information or vice versa from the client, wherein the client uses the dynamically-updated data packet loss ratio accumulated by the client as the look-up table key to access the one or more values in the look-up table to generate the client request, and wherein the client independently determines an adjusted transmission rate based on the dynamically-updated data packet loss ratio and one or more dynamically-changing values in the look-up table in the client associated with a set of dynamically-changing client characteristics, which changes during the data stream from the server to the client in real time;
receiving at least one audio input and at least one video input via an audio/video multiplexer system block; and
accepting the client request from the client for the adjustment of the transmission rate or the adjustment for the desired Luminance-Chrominance (YUV) conversion format for more video color content information to less video color content information or vice versa, wherein the step of accepting the client request is ultimately up to an intelligent video transport manager regardless of the client request for the adjustment;
processing the client request in the intelligent video transport manager for the adjustment of the transmission rate or the adjustment for the desired Luminance-Chrominance (YUV) conversion format for more video color content information to less video color content information or vice versa, wherein the processing of the client request in the intelligent video transport manager comprises:
   encoding the audio input and the video input in accordance with
      the client request;
   multiplexing the encoded audio and video inputs into the data stream in accordance with the client request; and
   transmitting the data stream to the client in accordance with the request from the client.

14. The method of claim 13, wherein the look-up table generated by the client further includes at least one of a display size, a maximum resolution, a color depth, a display type, a CPU type, one or more decoder capabilities, an available memory, a connection type, a previous connection history having transmission information, and a video display line structure.

15. An apparatus for real-time adaptive media transport management of continuous streaming of data packets, the apparatus comprising:
a CPU and a memory unit operatively connected to a server;
the server transmitting a first portion of a stream of multimedia data packets to a client via a LAN or WAN, wherein the server contains an intelligent video transport manager providing an adjustable data rate or an adjustable desired Luminance-Chrominance (YUV) conversion format for more video color content information to less video color content information or vice versa, depending on a current level of data packet loss ratio provided by the client;
the client receiving the first portion of the stream of the multimedia data packets from the server via the LAN or WAN, wherein the client has a look-up table containing information to determine a need for adjusting a YUV conversion format for a second portion of the multimedia data packets which is about to be transmitted to the client, and wherein the client independently requests to the server for an adjustment of the adjustable rate and the adjustable desired YUV conversion format based on a dynamically-updated data packet loss ratio and one or more dynamically-changing values in the look-up table in the client associated with a set of dynamically-changing client characteristics, which changes during the continuous streaming of data packets from the server to the client; and
the LAN or WAN operatively connected to the server and the client, wherein the LAN or WAN provides a pathway for transmission of data packets.

16. The apparatus of claim 15, wherein the server further comprises an audio/video multiplexer system to receive and encode an audio/video input stream, and a MAC buffer to place an encoded stream of multimedia data packets prior to transmission to the client.

17. The apparatus of claim 15, wherein the client further comprises an incoming buffer to accumulate the encoded stream of multimedia data packets transmitted by the client and an audio/video de-multiplexer system to decode at least some portions of the encoded stream of multimedia data.

18. The apparatus of claim 17, wherein the client further comprises a packet error accumulator calculating the data packet loss ratio in real-time, which is used as a look-up table key in the look-up table in the client.

19. The apparatus of claim 15, wherein the client sends a request to the server for adjusting the YUV conversion format for the second portion of the multimedia data packets which is about to be transmitted to the client by the server.

20. The apparatus of claim 19, wherein the server adjusts the YUV conversion format for the second portion of the multimedia data packets.

* * * * *